(12) United States Patent
Suzuki

(10) Patent No.: US 6,464,242 B2
(45) Date of Patent: Oct. 15, 2002

(54) FOLDING STROLLER

(75) Inventor: Yoshiyuki Suzuki, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 10/058,736

(22) Filed: Jan. 30, 2002

(65) Prior Publication Data

US 2002/0121766 A1 Sep. 5, 2002

(30) Foreign Application Priority Data

Jan. 31, 2001 (JP) ........................................ 2001-024379

(51) Int. Cl.$^7$ ................................................. B62K 1/00
(52) U.S. Cl. ........................ 280/642; 280/42; 280/47.4; 297/45; 297/423.26
(58) Field of Search ..................... 297/423.19, 423.26, 297/423.29, 42, 45; 280/42, 642, 644, 647, 650, 250.1, 304.1, 291, 47.38, 47.4

(56) References Cited

U.S. PATENT DOCUMENTS

| | | | | |
|---|---|---|---|---|
| 635,638 A | * | 10/1899 | Ballantine | 297/423.26 |
| 909,411 A | * | 1/1909 | Hockney | 297/423.26 |
| 2,133,540 A | * | 10/1938 | Jacobs | 297/423.26 |
| 3,833,256 A | * | 9/1974 | Dehner | 297/45 |
| 4,682,783 A | * | 7/1987 | Kischall | 280/250.1 |
| 5,244,222 A | * | 9/1993 | Benoit | 280/250.1 |
| 5,568,933 A | * | 10/1996 | Mizuno | 280/42 |

FOREIGN PATENT DOCUMENTS

| | | |
|---|---|---|
| DE | 3046339 A1 | 7/1982 |
| DE | 29509125 U1 | 9/1995 |
| EP | 1086876 A2 | 3/2001 |

* cited by examiner

*Primary Examiner*—Michael Mar
(74) *Attorney, Agent, or Firm*—Wenderoth, Lind & Ponack, L.L.P.

(57) ABSTRACT

A folding stroller has right and left front legs (2) and right and left rear legs (4) interconnected so as to be extendible and contractible in the right and left directions. A footrest (24) includes two support arms (61, 63) respectively having inner end parts pivotally connected with a pin (62). The footrest (24) is kept straight by a footrest locking mechanism including a sliding block (69) provided with a locking tongue (70) for restraining the two support arms (61, 63) from turning on the pin (62). A release wire (75) is extended inside the front leg (2) and has one end connected to the sliding block (69) and the other end connected to a pulley (76) supported for rotation in the front leg (2). A slot (77) is formed in a rear part of the front leg (2) facing a handle post (5a) in parallel to the axis of the front leg (2). The pulley (76) includes an operating lever (76a) projecting through the slot (77).

6 Claims, 10 Drawing Sheets

FOLDING STROLLER

BACKGROUND OF THE INVENTION

1. Field of the Invention

The present invention relates to a folding stroller capable of being compactly folded when not in use.

2. Description of the Related Art

Generally, a folding stroller for carrying a baby outdoors for walking and shopping is foldable when necessary. Various folding strollers designed to facilitate storage and carrying have been proposed.

A folding stroller of this kind is designed on the basis of a principle analogous with the principle of pipe-frame type folding chairs. Such a folding stroller has frames provided with casters and capable of being folded and unfolded in the front and rear directions. The frame is formed so as to be folded and unfolded in the right and left directions so that the frame can be folded in a small width. When the frame is thus folded in the right and left directions, a handle connected to an upper end part of the frame extends in an L-shape. The handle thus folded in the L-shape is put on the arm of a user to carry the folded folding stroller when getting on and off a train or a bus.

The basic height of the folding stroller of such construction is determined so that an adult person is able to put hands easily on the handle connected to the upper end of the frame to push the folding stroller. The height (length) of the folding stroller in a folded state is basically the same as the height of the folding stroller in an unfolded state. Therefore, when carrying the folded folding stroller, the casters touch the ground and hence the folded folding stroller is difficult to carry. The arm holding the folded folding stroller must be raised high to prevent the casters from touching the ground, which makes carrying the folded folding stroller for a long time difficult.

A folding stroller mentioned in Japanese Patent No. 2572278 has a foldable handle which can be folded in two to reduce the height (length) of the folding stroller in a folded state.

However, the folding stroller of such construction requires carrying out a troublesome folding operation including operating a locking button placed on the handle, folding the handle, and folding a guard and the associated parts. This known folding stroller is not locked in the folded state and a locking mechanism for locking the folding stroller in an unfolding state does not work automatically when the folding stroller is unfolded. Therefore, it is possible that the user fail to lock the unfolded folding stroller and the folding stroller is unfolded unintentionally incompletely. Despite its complicated construction, the frame of the known folding stroller is bent and extends forward when the folding stroller is folded, which is not preferable in view of reducing the size in the front and rear directions of the folded folding stroller and is practically disadvantageous.

The inventors of the present invention have proposed a folding stroller having axially contractible frames capable of being easily contracted by a sliding operation (U.S. patent application No. 09/482,272). This folding stroller is simple in construction, easy to fold, has a locking mechanism capable of being automatically engaged and disengaged when the folding stroller is folded and unfolded, and has vertical and front/rear dimensions capable of being effectively reduced when the folding stroller is folded.

SUMMARY OF THE INVENTION

The present invention has been made in connection with the above folding strollers and it is therefore an object of the present invention to provide a folding stroller having a footrest capable of being surely and safely locked and unlocked by folding and unfolding operations when the folding stroller is folded and unfolded.

The present invention provides a folding stroller including a pair of right and left front legs respectively provided with front wheels at their lower ends; a pair of right and left rear legs pivotally joined to the right and left front legs, respectively, the right and left rear legs being respectively provided with rear wheels at their lower ends; a handle supported on the right and left front legs; a footrest having opposite ends respectively connected to lower parts of the right and left front legs, the footrest including two support arms respectively having inner end parts pivotally connected with a pin, and a footrest locking mechanism for restraining the two support arms from turning on the pin to keep the footrest straight; an unlocking member placed inside at least one of the right and left front legs, that is selected for use as an unlocking member holding front leg; and a release wire extended inside the unlocking member holding front leg, the release wire having one end connected to the footrest locking mechanism and the other end connected to the unlocking member.

In the present invention, it is preferable that the unlocking member placed inside the unlocking member holding front leg has an operating part extending outside through an opening formed in the wall of the unlocking member holding front leg. Preferably, the unlocking member is a pulley supported for turning about a horizontal axis perpendicular to the axis of the unlocking member holding front leg, and the pulley includes an operating lever as the operating part. Preferably, the handle has right and left straight handle posts supported for axial sliding relative to the right and left front legs, respectively, the operating part of the unlocking member projects from the unlocking member holding front leg so as to be in contact with the lower end of the straight handle post supported for axial sliding along the unlocking member holding front leg, and the unlocking member is moved in an unlocking direction as the straight handle post is moved axially downward along the unlocking member holding front leg.

In the present invention, it is preferable that the folding stroller further includes a pair of right and left holders put respectively on the right and left front legs, and the right and left holders slidably supporting the right and left straight handle posts of the handle, respectively; and a pair of straight handle post locking mechanisms put respectively on the right and left straight handle posts to lock the right and left straight handle posts at lower positions on the right and left front legs or at upper positions on the right and left front legs.

In the present invention, it is preferable that the right and left front legs and the right and left rear legs are interconnected so as to be extendible and contractible in the right and left directions.

According to the present invention, the release wire having one end connected to the footrest locking mechanism for locking the footrest in an unfolded state is extended through at least one of the front legs, serving as the unlocking member holding front leg, and the other end of the release wire is connected to the unlocking member placed inside the unlocking member holding front leg. Therefore, the footrest can be surely and safely locked by the unfolding operation and can be surely and safely unlocked by the folding operation. Particularly, when the unlocking member is moved in the unlocking direction by the movement of the straight handle post, the footrest can be unlocked or locked simply by the sliding movement of the straight handle post when folding or unfolding the folding stroller. Since the unlocking member can be surely held in an unlocking state by the straight handle post when the footrest is unlocked, the folding stroller can be folded without any hindrance. Since the release wire for unlocking the footrest is extended inside the front leg and is connected to the unlocking member placed inside the front leg, the release wire is concealed. Thus, the release wire does not spoil the aesthetic appearance of the folding stroller and the obstruction of the unlocking operation by the engagement of the release wire with an external object can be surely prevented.

DESCRIPTION OF THE PREFERRED EMBODIMENTS

A folding stroller in a preferred embodiment of the present invention will be described with reference to the accompanying drawings.

Figure 1:
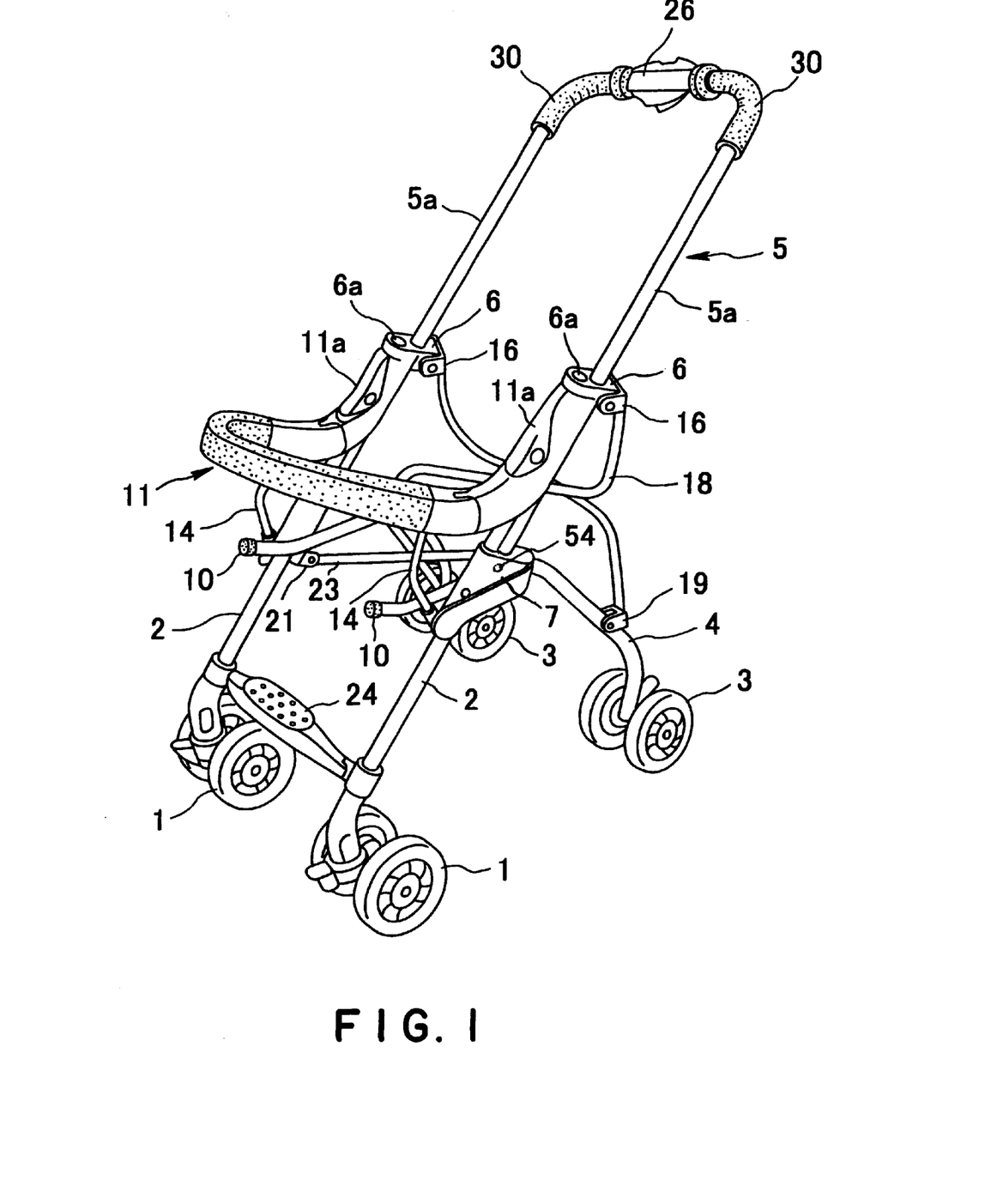
FIG. 1 is a schematic perspective view of a folding stroller in a preferred embodiment of the present invention.
Figure 2:
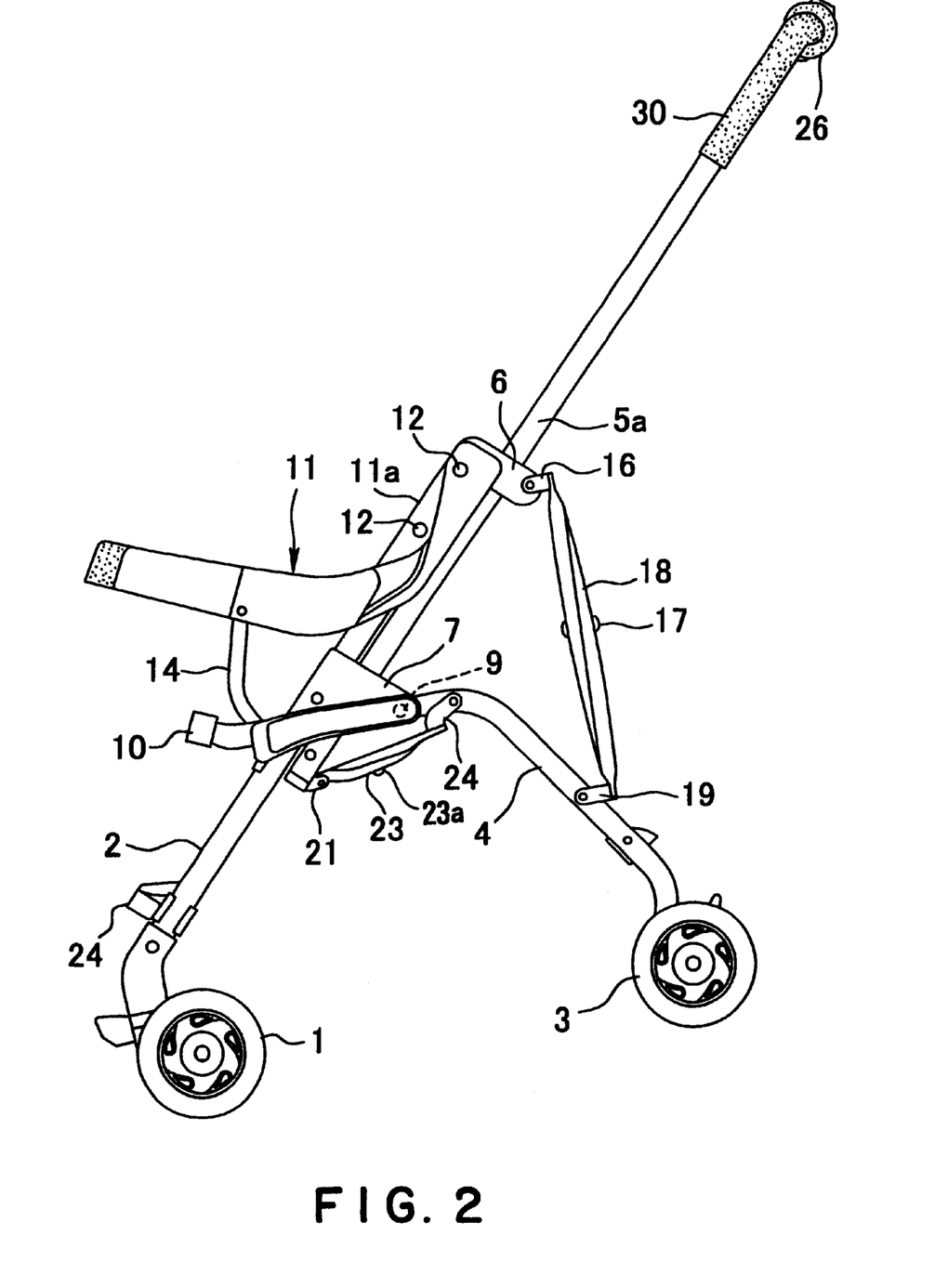
FIG. 2 is a side elevation of the folding stroller shown in FIG. 1.
Figure 8:
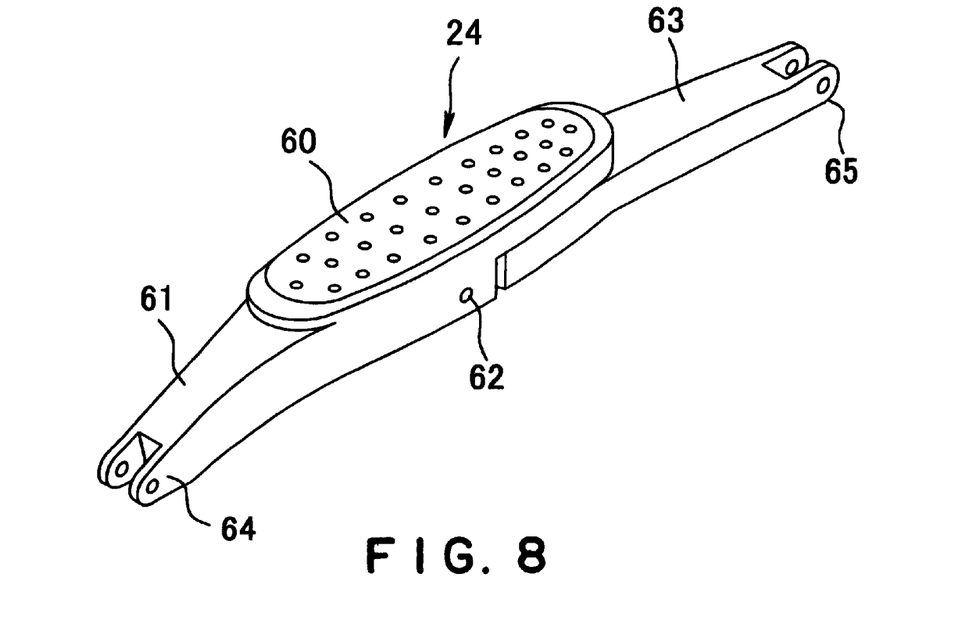
FIG. 8 is a perspective view of a footrest included in the folding stroller shown in FIGS. 1 and 2.
Figure 12:
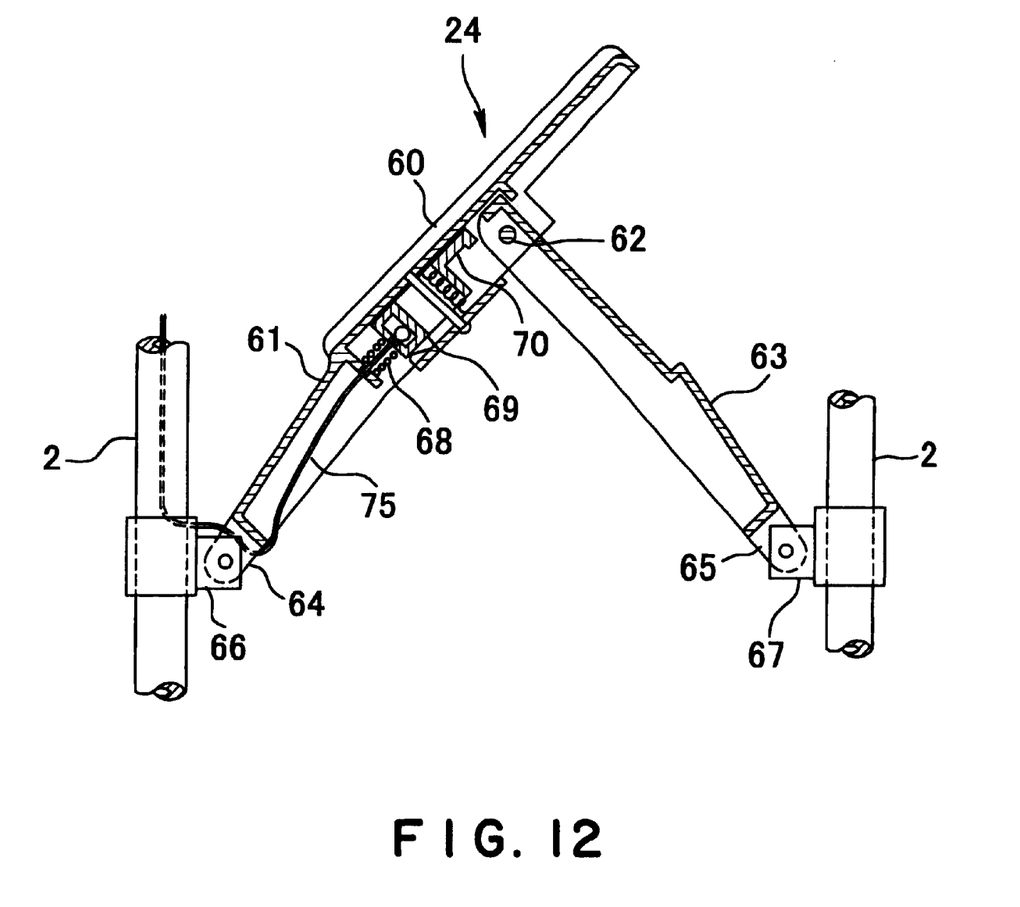
FIG. 12 is a sectional front elevation of the footrest shown in FIG. 8 in a folded state.

Referring to FIGS. 1 and 2, a folding stroller in a preferred embodiment of the present invention includes right and left front legs 2, front wheels 1 respectively connected to the lower ends of the front legs 2, right and left rear legs 4 having upper ends pivotally joined to substantially middle parts of the front legs 2, respectively, rear wheels 3 respectively connected to the lower ends of the rear legs 4, and a U-shaped handle 5 connected to upper parts of the right and left front legs 2. A footrest 24 has opposite ends joined to lower parts of the front legs 2. As shown in FIGS. 8 and 12, the footrest 24 can be folded only in an upward convex shape. Although a baby seat made of cloth and meshed bags are attached to the front legs 2 and the rear legs 4, the baby seat and the bags are omitted to facilitate understanding the construction of the folding stroller.

The front legs 2, the rear legs 4 and the handle 5 are formed by processing aluminum or steel lightweight pipes. Each front leg 2 is straight or has a curved lower part. Each rear leg 4 is curved. The handle 5 has right and left straight handle posts 5a. The straight handle posts 5a are extended in parallel to the front legs 2. The front wheels 1 and the rear wheels 3 are attached to the lower ends of the front legs 2 and the lower ends of the rear legs 4, respectively. Each of the front wheels 1 and the rear wheels 3 is a double caster provided with a foot-operated brake. The front wheels 1 and the rear wheels 3 have upper mounting parts fitted in and fastened with screws to lower end parts of the front legs 2 and the rear legs 4, respectively.

As shown in FIGS. 1, 2, 3A and 3B, upper holders 6 and lower holders 7 are fastened to upper end parts and substantially middle parts, respectively, of the front legs 2 with screws.

Figure 4:
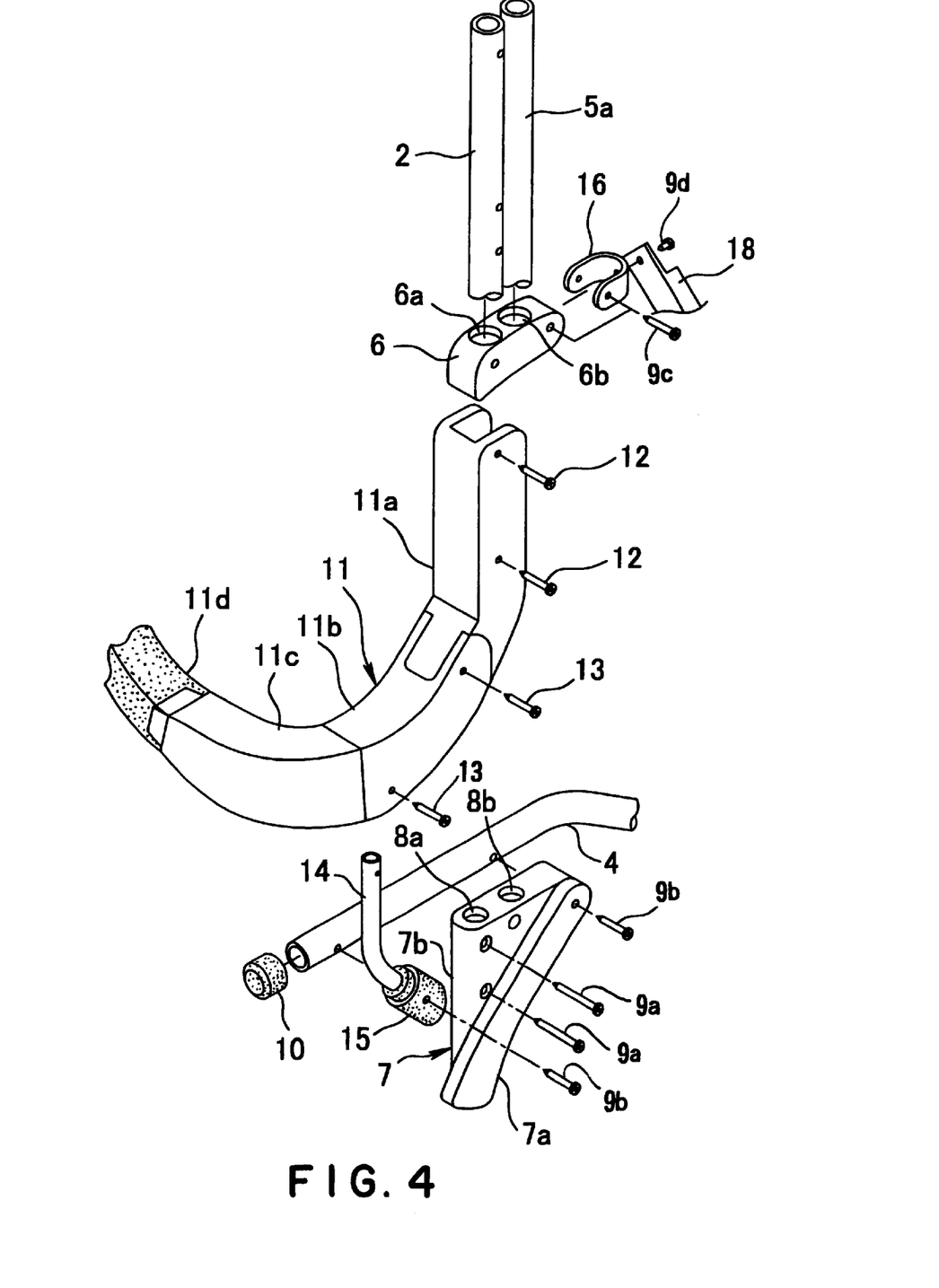
FIG. 4 is an exploded perspective view of the guard circle and the associated parts included in the folding stroller shown in FIGS. 1 and 2.

As shown in FIG. 4, each upper holder 6 is provided with two vertical through holes 6a and 6b one in front of the other. An upper end part of the front leg 2 is fixedly fitted in the front through hole 6a, and the straight handle post 5a is passed through the rear through hole 6b so that the straight handle post 5a is able to turn in the rear through hole 6b and to slide along the rear side of the front leg 2.

Each lower holder 7 has a side guard 7a of a synthetic resin, and a triangular holder body 7b formed integrally with the side guard 7a on the inner side of the side guard 7a. The holder body 7b is provided with two vertical through holes 8a and 8b formed one in front of the other. The front leg 2 is passed through the front through hole 8a and is fastened to the holder body 7b with screws 9a. The straight handle post 5a is passed through the rear through hole 8b so that the straight handle post 5a is able to turn in the rear through hole 8b and to slide relative to the holder body 7b. A front end part of the rear leg 4 is pivotally joined to a rear part of the lower holder 7 by a support pin 9b extended through the side guard 7a. The front end of the rear leg extends forward beyond the front leg 2, and a protective rubber cap 10 is put on the front end of the rear leg 4.

Figure 3A:
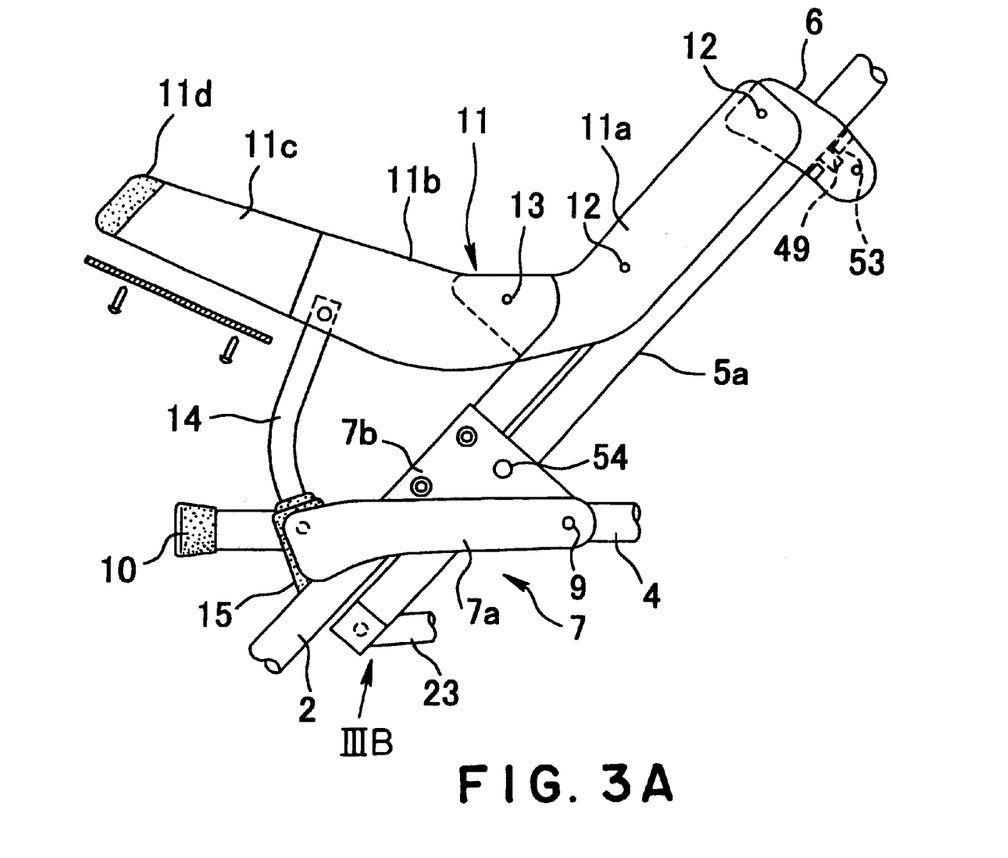
FIG. 3A is an enlarged side elevation of a guard circle and associated parts included in the folding stroller shown in FIGS. 1 and 2.

A curved guard bar 11 has base parts 11a put on the upper holders 6 so as to cover upper end parts of the front legs 2. The upper end part of the front leg 2, the base part 11a of the guard bar 11 and the upper holder 6 are fastened together with a screw 12. The guard bar 11 has the base parts 11a respectively fastened to the front legs 2, armrests 11b pivotally joined to the lower ends of the base parts 11a with support pins 13, respectively, curved guard part holding parts 11c fitted in front end parts of the armrests 11b, respectively, and a curved guard part lid having opposite ends fitted in front end parts of the guard part holding parts 11c, respectively. The guard part lid is formed of an elastomer, such as rubber or an elastic plastic material, and is flexible and bendable. The armrests 11b of the guard bar 11 and front end parts of the rear legs 4 are interconnected with links 14, respectively. Rubber feet 15 are put on the lower ends of the links 14. The rubber feet 15 rest on the front legs 2, respectively, to bear loads applied to the armrests 11b when the folding stroller is unfolded as shown in FIGS. 1 and 3A.

The guard part 11d of the guard bar 11 may be formed only of an elastomer or may be formed by sheathing a rigid member, such as a wire, a stainless steel plate, a coil spring or a flat spring, in a covering of an elastomer. When the guard part lid is formed only of an elastomer, the guard part 11d is formed in a big thickness to make the same rigid, and is fastened directly to the guard part holding parts 11c with pins or the like. When the guard part 11d is formed by sheathing a rigid member in a sheath, the rigid member is fastened to the guard part holding parts 11c with pins or the like.

Naturally, the curved guard part 11d of the curved guard bar 11 may be omitted when carrying a baby in late babyhood. In such a case, the guard part holding parts 11c may be disconnected from the armrests 11b together with the curved guard part 11d, and caps may be put on the free ends of the armrests 11b.

U-shaped brackets 16 are fastened to rear end parts of the upper holders 6 attached to the right and left front legs 2 with screws 9c, respectively. Upper ends of two links forming an X-shaped first linkage 18 are joined pivotally to the brackets 16 with pins 9d. As shown in FIGS. 1 and 2, the first linkage 18 is formed by pivotally joining middle parts of the two links with a pin 17. Lower ends of the two links of the first linkage 18 are pivotally joined with pins, not shown, to brackets 19 fastened to the rear legs 4 with screws.

Figure 3B:
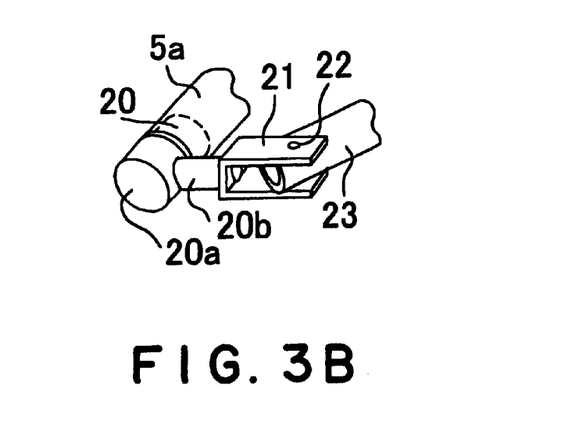
FIG. 3B is an enlarged view of a part IIIB in FIG. 3A.

As shown in FIG. 3B, cylindrical plugs 20 are fitted in and fastened with screws to lower end parts of the straight handle posts 5a projecting downs from the lower holders 7, respectively. Each cylindrical plug 20 has a rotary head 20a restrained from axial movement and capable of turning about its axis. A projection 20b projects radially from the rotary head 20a. Each of U-shaped members 21 has a bottom wall and side walls extending from the opposite sides of the bottom wall. The bottom wall of the U-shaped member 21 is held for turning on the free end of the projection 20b with a screw. An X-shaped second linkage 23 is formed by pivotally joining middle parts of two links with a pin 23a as shown in FIGS. 1 and 2. Each of the links forming the second linkage 23 has a front end part pivotally supported on the side walls of the U-shaped member 21, and a rear end part pivotally joined to a bracket 24 attached to a bend formed in a substantially middle part of the rear leg 4.

Figure 5A:
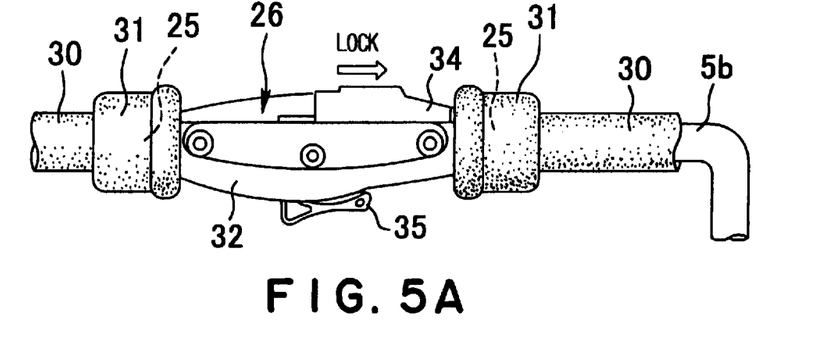
FIGS. 5A and 5B are enlarged views of an upper part of a handle included in the folding stroller shown in FIGS. 1 and 2, respectively showing the upper part of the handle in a locking state and an unlocking state.
Figure 5B:
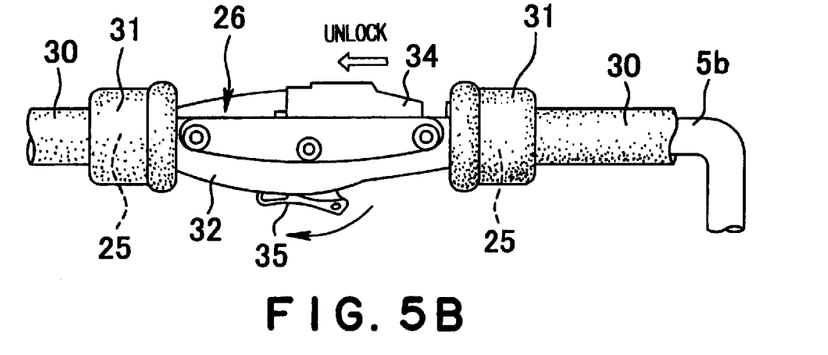

The handle 5 has the right and left straight handle posts 5a extending in parallel to the front legs 2. Referring to FIGS. 5A and 5B, upper end parts of the straight handle posts 5a are bent in the shape of the inverted letter L to form right and left horizontal parts 5b. Joints 25 connect the right and left horizontal parts 5b to the opposite ends of a middle connecting unit 26. The middle connecting unit 26, the joints 25 and the horizontal parts 5b form a gripping unit. The horizontal parts 5b can be turned through an angle of 90° on the joints 25 between an unfolded position, at which the horizontal parts 5b extend on the axis of the middle connecting unit 26, and a folded position, at which the horizontal parts 5b extends at an angle of 90° to the axis of the middle connecting unit 26. As mentioned above, the right and left straight handle posts 5a are axially slidable relative to the upper holders 6 and the lower holders 7. The straight handle posts 5a are moved axially downward along the front legs 2 to reduce the height of the folding stroller.

As shown in FIGS. 1, 2, 5A and 5B, grips 30 of an elastomer are put on the upper end parts of the straight handle posts 5a bent in the shape of the inverted letter L and the horizontal parts 5b, respectively. The joints 25 are covered with covers 31 of an elastomer, respectively. The construction of the joints 25 is analogous with those of joints employed in general folding strollers and hence the description thereof will be omitted.

The connecting unit 26 has a housing 32 formed of a synthetic resin in a shape easy to grip. An operating mechanism for locking and unlocking is formed in the housing 32. The connecting unit 26 also has a sliding locking member 34 supported for lateral sliding on the housing 32, and a triggerlike locking mechanism operating lever 35 partly projecting from a lower middle part of the housing 32.

Figure 6:
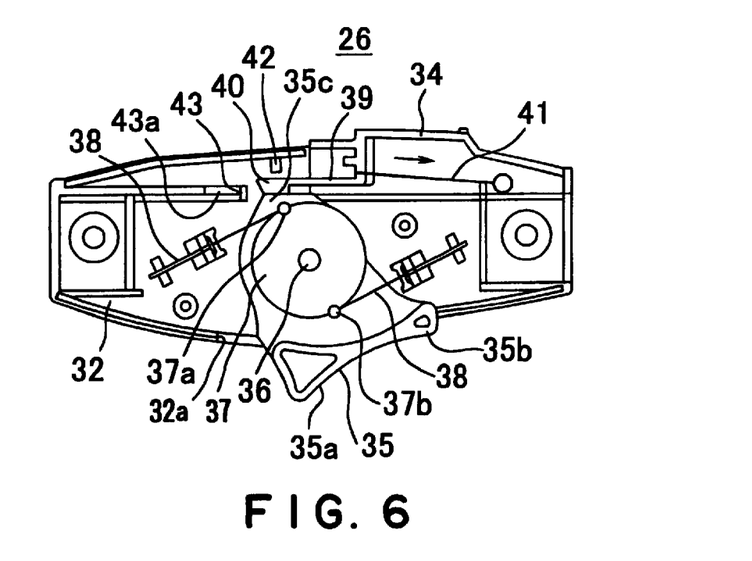
FIG. 6 is a schematic sectional view of a connecting part in the upper part of the handle shown in FIGS. 5A and 5B.

As shown in FIG. 6, the housing 32 is formed by fastening two plastic moldings together with screws and defines a space for holding the operating mechanism and necessary members therein. A support shaft 36 is formed integrally with the housing 32 so as to extend in a central region of the space defined by the housing 32. The support shaft 36 is passed through a hole formed in a central part of the locking mechanism operating lever 35 to support it for turning thereon. An unlocking part 35a and a locking part 35b of the locking mechanism operating lever 35 project outside the housing 32 through an opening 32a formed in the housing 32. The user is able to apply pressure to the unlocking part 35a or the locking part 35b. The locking mechanism operating lever 35 has a working part 35c on the opposite side of the unlocking part 35a and the locking part 35b with respect to the support shaft 36.

A disk 37 is formed integrally and coaxially with the locking mechanism operating lever 35. Two release wire retaining parts 37a and 37b are formed in peripheral parts of the disk 37, respectively. The respective free ends of release wires 38 are engaged with the release wire retaining parts 37a and 37b, respectively. When the unlocking part 35a is pressed in a state shown in FIG. 6, the locking mechanism operating lever 35 turns clockwise to pull the release wires 38.

The locking member 34 is formed of a material that is the same as that forming the housing 32 by injection molding. As shown in FIGS. 5A and 5B, the locking member 34 is fitted on the housing 32 for lateral sliding movement. In FIG. 5A, the locking member 34 is at a locking position on the housing 32 to hold the locking mechanism operating lever 35 in a locking state in which the locking mechanism operating lever 35 is unable to turn. In FIG. 5B, the locking member 34 is at an unlocking position on the housing 32 to hold the locking mechanism operating lever 35 in an unlocking state in which the locking mechanism operating lever 35 is able to turn.

The locking member 34 has a thin tongue 39 provided at its free end with a projection 40 projecting from the thin part 39 in a direction perpendicular to a line along which the locking member 34 slides. The locking member 34 is biased toward the locking position shown in FIG. 5A by an extension spring 41.

The housing 32 is provided with a stopping projection 42 formed opposite to the locking mechanism operating lever 35 with respect to the projection 40. The housing 32 has a wall 43 extending near to the projection 40 and provided in its extremity with a groove 43a in which the projection 40 engages.

The tongue 39 provided with the projection 40 may be formed integrally with the locking member 34 by molding or may be formed from a steel flat spring or of an engineering plastic material, such as a polyamide resin or a polyacetal resin, by molding, and fastened to the locking member 34. When the tongue 39 provided with the projection 40, and the locking member 34 are formed separately, the elasticity of the tongue 39 provided with the projection 40 can be optionally determined and hence the stopping projection 42 can be omitted.

Each handle post 5a is provided with a handle post locking mechanism 45 for fastening the handle post 5a to the upper holder 6 or the lower holder 7. The handle post locking mechanism 45 cooperates with the upper holder 6 or the lower holder 7 to lock the handle post 5a at a lower position, i.e., a folding position, or an upper position, i.e., an unfolding position. The handle post 5a can be moved along the front leg 2 between the lower position and the upper position.

Figure 7A:
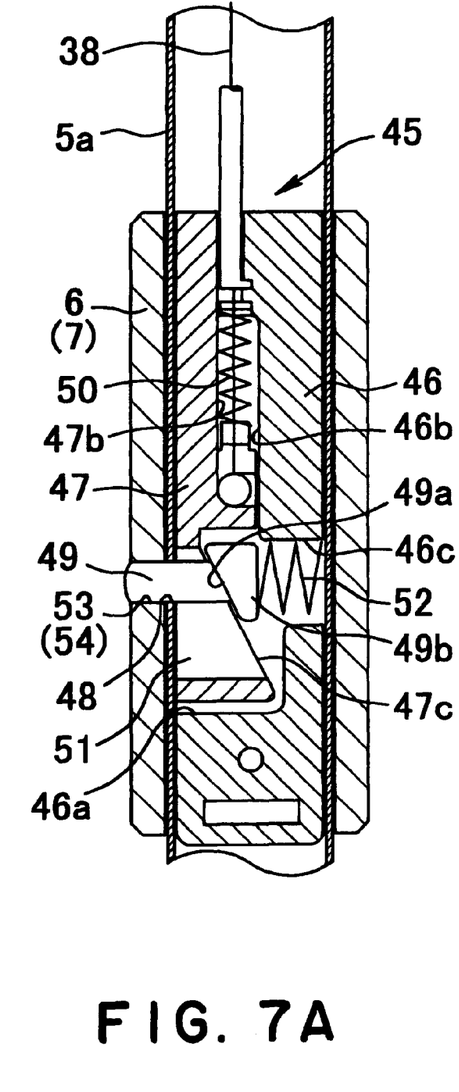
FIGS. 7A and 7B are sectional views of a locking pin operating mechanism placed on a straight handle post of a handle included in the folding stroller shown in FIGS. 1 and 2, respectively showing the locking pin operating mechanism in a locking state and an unlocking state.
Figure 7B:
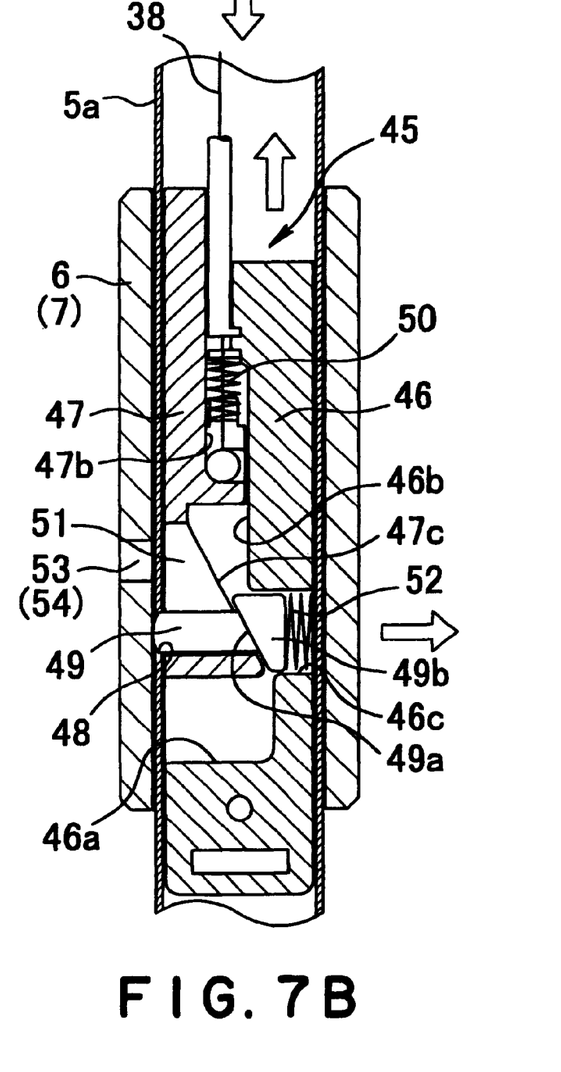

Referring to FIGS. 7A and 7B, the handle post locking mechanism 45 includes a semicylindrical fixed block 46 and a semicylindrical sliding block 47. The fixed block 46 and the sliding block 47, when joined together, form a cylindrical block of a diameter substantially equal to the inside diameter of the handle post 5a. The fixed block 46 is fixedly held in the handle post 5a, while the sliding block 47 is slidable in the handle post 5a. The downward movement of the sliding block 47 is limited by a stopping part 46a formed in a lower part of the fixed block 46. A locking pin 49 is supported near the stopping part 46a of the fixed block 46 so as to be movable in directions perpendicular to directions in which the sliding block 47 slides. The locking pin 49 can be projected from the handle post 5a through an opening 48 formed in the handle post 5a and can be retracted into the handle post 5a through the opening 48.

The respective flat surfaces facing each other of the fixed block 46 and the sliding block 47 are provided with axial grooves 46b and 47b, respectively. The grooves 46b and 47b define a bore. The lower end of the release wire 38 is connected to a part of the sliding block 47 corresponding to the lower end of the groove 47b. A compression spring 50 is extended in the bore defined by the grooves 46b and 47b to bias the sliding block 47 toward the stopping part 46a of the fixed block 46.

A slot 51 is formed in a lower part of the sliding block 47 to allow the projection of an end part of the locking pin 49 by a length corresponding to the stroke of the sliding block 47. A slope 47c inclined to the opening 48 is formed in a part on the rear side of the slot 51. The locking pin 49 is provided with a head 49b having an inclined sliding surface 49a engaged with the slope 47c of the sliding block 47. The locking pin 49 is biased so as to project outside through the opening 48 of the handle post 5a by a compression spring 52 placed in a hole 46c formed in the fixed block 46 so as to extend perpendicularly to the axis of the handle post 5a.

When the locking member 34 of the connecting unit 26 is placed at the locking position as shown in FIG. 6, the projection 40 is close to the stopping projection 42. Consequently, the working part 35c of the locking mechanism operating lever 35 is restrained from turning and hence the locking mechanism operating lever 35 cannot be turned in a clockwise direction by pressing the unlocking part 35a.

When the locking member 34 is shifted to the unlocking position against the resilience of the spring 41 as shown in FIG. 5B, the projection 40 moves over the end part of the wall 43 and engages in the groove 43a formed in the end part of the wall 43. In this state, the thick projection 40 is moved away from the working part 35c and the thin tongue 39 of the locking member 34 is opposite to the working part 35c. Therefore, the working part 35c of the locking mechanism operating lever 35 is spaced from the tongue 39 by a distance sufficient for permitting the working part 35c to turn. Consequently, the disk 37 formed integrally with the locking mechanism operating lever 35 can be turned clockwise by pressing the unlocking part 35a to pull the right and left release wires 38.

When the locking mechanism operating lever 35 is turned clockwise by pressing the unlocking part 35a of the locking mechanism operating lever 35, the working part 35c comes into engagement with the tongue 39 to raise the tongue 39. Consequently, the projection 40 is disengaged from the groove 43a. Then, the locking member 34 is pulled in the direction of the arrow (see FIG. 6) toward the locking position by the spring 41, and the projection 40 moves over the wall 43. In this state, the projection 40 is restrained from returning to its locking position by the working part 35c.

When the locking mechanism operating lever 35 is at the locking position shown in FIG. 6 and any tensile force is exerted on the release wires 38, the sliding blocks 47 are biased toward the stopping parts 46a of the fixed blocks 46 by the compression springs 50, and the slopes 47c are at the lower position as shown in FIG. 7A. Therefore, the locking pins 49 project outside through the openings 48 and engage in locking holes 53 (locking holes 54) formed in the upper holders 6 (the lower holders 7) to restrain the handle posts 5a from axial movement.

When the locking mechanism operating lever 35 is turned clockwise by pressing the unlocking part 35a to pull the release wires 38, the sliding blocks 47 are pulled up against the resilience of the compression springs 50, the slopes 47c of the sliding blocks 47 engages with the sliding surfaces 49a of the locking pins 49, and the locking pins 49 are extracted from the locking holes 53 (the locking holes 54) of the upper holders 6 (the lower holders 7) and retracted into the handle posts 5a as shown in FIG. 7B. Consequently, the handle posts 5a are able to slide axially relative to the upper holders 6 and the lower holders 7.

As shown in FIG. 3A, the locking hole 53 of each upper holder 6 is formed substantially in the front and rear directions in the rear wall of the upper holder 6, and the locking hole 54 of the lower holder 7 is formed substantially in the right and left directions in a side wall of the lower holder 7.

When the folding stroller is unfolded and the handle posts 5a are fully extended, the horizontal parts 5b and the connecting unit 26 of the handle 5 extend in a straight line, and the locking pins 49 are engaged in the locking holes 53 of the upper holders 6 to hold the handle posts 5a in an extended state.

When folding the folding stroller in this unfolded state, the locking mechanism operating lever 35 is operated to extract the locking pins 49 from the locking holes 53 of the upper holders 6 by pulling the release wires 38, the handle posts 5a are pushed down so as to slide downward along the front legs 2 to move the handle post locking mechanisms 45 to positions corresponding to the lower holders 7, respectively, the horizontal parts 5b of the handle 5 are turned forward on the joints 25, and the locking mechanism operating lever 35 is turned counterclockwise by pressing the locking part 35b to remove the tensile force from the releasing wires 38. Then, the locking pins 49 engages in the locking holes 54 of the lower holders 7 to hold the handle posts 5a at their lower positions. These folding steps are reversed to unfold the folded folding stroller.

When the handle posts 5a are moved upward or downward and the same are turned to bring the locking pins 49 into alignment with the locking holes 53 of the upper holders 6 or the locking holes 54 of the lower holders 7, the locking pins 49 are projected automatically through the locking holes 53 or the locking holes 54 by the springs 52 to lock the handle posts 5a automatically in place.

Figure 9:
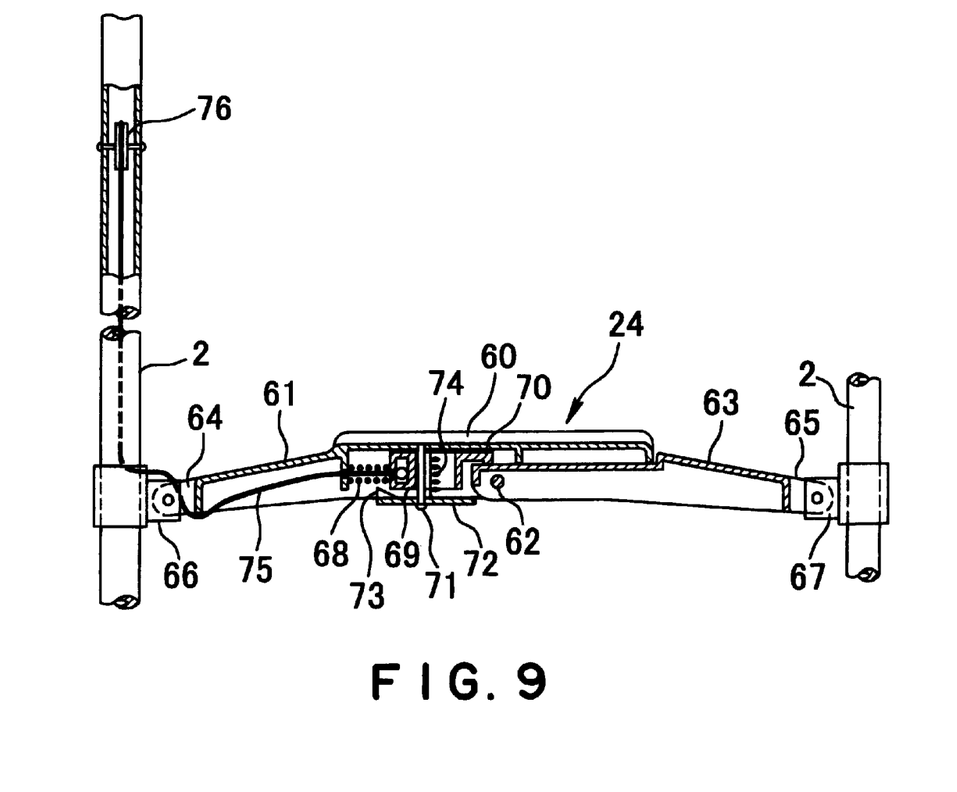
FIG. 9 is a perspective view of a footrest locking mechanism included in the folding stroller shown in FIGS. 1 and 2.

Referring to FIG. 8 showing the footrest 24 in a perspective view, the component members of the footrest 24 is formed of a synthetic resin by molding or aluminum by die casting. The footrest 24 has a first support arm 61 and a second support arm 63, which are joined pivotally with a pin 62. Inner end part on the side of the pin 62 of the first support arm 61 extends beyond the pin 62 so as to overlie an inner end part of the second support arm 63. A substantially elliptic step plate 60 is attached to the upper surface of the inner end part of the first support arm 61. Since the inner end part of the first support arm 61 overlies the inner end part of the second support arm 63, the pin 62 pivotally joining the first support arm 61 and the second support arm 63 can be moved upward such that the footstep 24 is folded in an upward convex shape. Bifurcate joining parts 64 and 65 are formed in outer end parts of the support arms 61 and 63, respectively. As shown in FIG. 9, the joining parts 64 and 65 are joined pivotally to projections 66 and 67 fixed to lower parts of the front legs 2, respectively.

A sliding block 69 is supported for sliding in the first support arm 61 and is biased toward the second support arm 63 by a coil spring 68. The sliding block 69 is provided with a locking tongue 70 projecting toward the second support arm 63. The locking tongue 70 is inserted in a gap between the upper surface of the second support arm 63 and the lower surface of the first support arm 61 to restrain the support arms 61 and 63 from turning on the pin 62 and to keep the footrest 24 straight. A swing plate 72 is supported for swinging below the sliding block 69 by a pin 71. The swing plate 72 is provided on the upper surface of one end thereof with a locking projection 73. The locking projection 73 engages with an end surface of the sliding block 69 to limit the movement of the sliding block 69. A second coil spring 74 is extended in a part of the sliding block 69 on the side of the locking tongue 70 between the first support arm 61 and the swing plate 72. The second spring 74 biases the first support arm 61 away from the swing plate 72.

Figure 10:
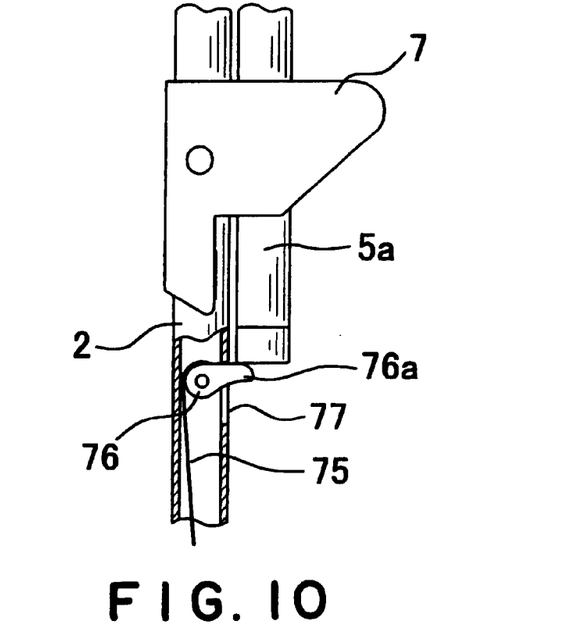
FIG. 10 is a partly sectional side elevation of an operating mechanism for operating the footrest locking mechanism.

One end of a release wire 75 is connected to a part of the sliding block 69 on a side opposite to the locking tongue 70. The release wire 75 is extended through a hole formed in one of the front legs 2 into the same front leg 2 and the other end of the release wire 75 is fastened to a pulley (unlocking member) 76 supported for rotation in the front leg 2. As shown in FIG. 10, a slot 77 is formed in a rear part of the front leg 2 facing the handle post 5a in parallel to the axis of the front leg 2. The pulley 76 includes an operating lever 76a projecting through the slot 77.

When the folding stroller is unfolded as shown in FIG. 1, the handle post 5a is pulled up and the operating lever 76a projects outside the front leg 2 through the slot 77 as shown in FIG. 10. In the state shown in FIG. 10, any tensile force is not exerted on the release wire 75, the sliding block 69 is held on the side of the second support arm 63, the locking tongue 70 is engaged with the upper surface of the inner end part of the second support arm 63 to prevent the footrest 24 from being folded.

Figure 11:
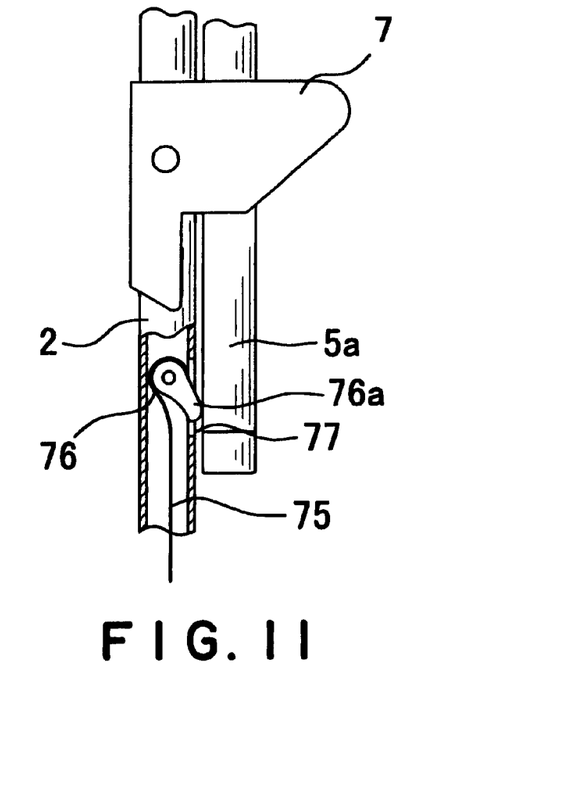
FIG. 11 is a partly sectional view of the operating mechanism shown in FIG. 10 in an unlocking state.

When the locking mechanism operating lever 35 of the connecting unit 26 of the handle 5 is operated to pull out the locking pins 49 from the locking holes 53 of the upper holders 6 and the handle posts 5a are moved downward relative to the front legs 2, the handle post 5a turns the operating lever 76a clockwise as shown in FIG. 11. Consequently, the pulley 76 is turned clockwise to pull the release wire 75, the sliding block 69 is moved to the left, as viewed in FIG. 9, against the resilience of the coil spring 68 to disengage the locking tongue 70 from the second support arm 63.

When the horizontal parts 5b of the handle 5 are turned forward on the joints 25 in this state, first linkage 18 and the second linkage 23 are contracted, the footrest 24 is folded as shown in FIG. 12, the right and left front legs 2, the rear legs 4 and the handle posts 5a are translated and gathered. At the same time, the locking pins 49 engages in the locking holes 54 of the lower holders 7 to hold the folding stroller in the folded state shown in FIG. 13.

Figure 13:
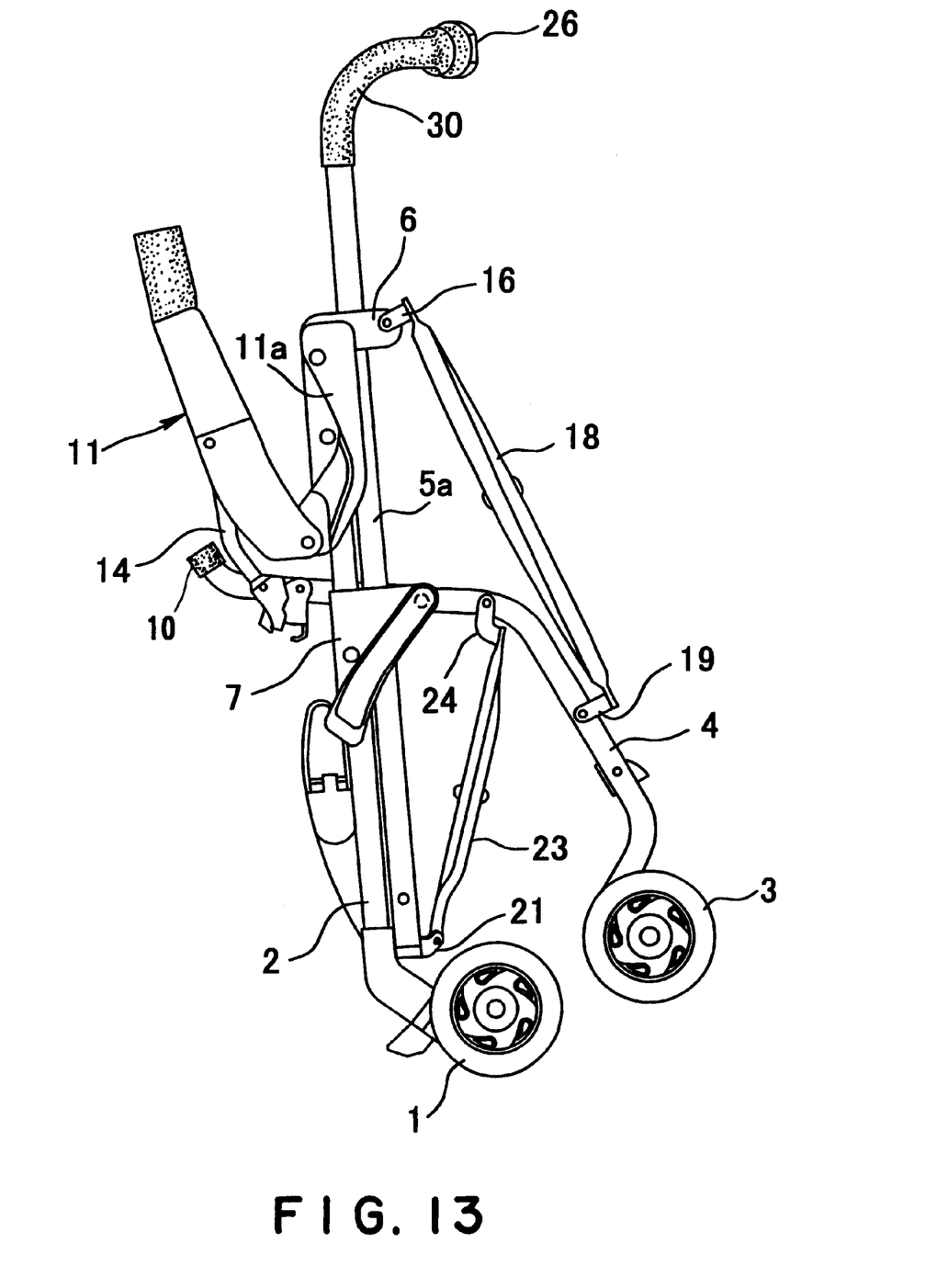
FIG. 13 is a side elevation of the folding stroller shown in FIGS. 1 and 2 in a folded state.

When unfolding the folded folding stroller shown in FIG. 13, the locking mechanism operating lever 35 is turned in the unlocking direction to extract the locking pins 49 from the locking holes 54 of the lower holders 7, and the horizontal parts 5b are turned on the joints 25 so that the horizontal parts 5b of the handle 5 and the connecting unit 26 are extended in a straight line. Consequently, the first linkage 18 and the second linkage 23 are expanded and the footrest 24 is extended straight. Then, the handle posts 5a are pulled up to release the operating lever 76a, so that the pulley 76 is turned counterclockwise from a position shown in FIG. 11 to a position shown in FIG. 10. Thus, the tensile force is removed from the release wire 75, the sliding block 69 is moved by the coil spring 68, and the locking tongue 70 engages with the second support arm 63 to lock the first support arm 61 and the second support arm 63 as shown in FIG. 9. As the handle posts 5a are pulled up further, the locking pins 49 engages in the locking holes 53 of the upper holders 6 to lock the folding stroller in the unfolded state shown in FIG. 1.

What is claimed is:

1. A folding stroller comprising:
   a pair of right and left front legs respectively provided with front wheels at their lower ends;
   a pair of right and left rear legs pivotally joined to the right and left front legs, respectively, said right and left rear legs being respectively provided with rear wheels at their lower ends;
   a handle supported on the right and left front legs;
   a footrest having opposite ends respectively connected to lower parts of the right and left front legs, said footrest including two support arms respectively having inner end parts pivotally connected with a pin, and a footrest locking mechanism for restraining the two support arms from pivoting about the pin to keep the footrest in a straight position;
   an unlocking member placed inside at least one of the right and left front legs, the at least one leg being selected for use as an unlocking member holding front leg; and
   a release wire extended inside the unlocking member holding front leg, said release wire having one end connected to the footrest locking mechanism and an other end connected to the unlocking member.

2. The folding stroller according to claim 1, wherein the unlocking member placed inside the unlocking member holding front leg has an operating part extending outside through an opening formed in a wall of the unlocking member holding front leg.

3. The folding stroller according to claim 2, wherein the unlocking member is a pulley supported for turning about a horizontal axis perpendicular to an axis of the unlocking member holding front leg, and the pulley includes an operating lever as the operating part.

4. The folding stroller according to claim 3, wherein the handle has a pair of right and left straight handle posts supported for axial sliding relative to the right and left front legs, respectively, the operating part of the unlocking member projects from the unlocking member holding front leg so as to be in contact with a lower end of the straight handle post supported for axial sliding along the unlocking member holding front leg, and the unlocking member is moved in an unlocking direction as the straight handle post is moved axially downward along the unlocking member holding front leg.

5. The folding stroller according to claim 4, further comprising:

a pair of right and left holders provided respectively on the right and left front legs, said right and left holders slidably supporting the right and left straight handle posts of the handle, respectively; and a pair of straight handle locking mechanisms provided respectively on the right and left straight handle posts to lock the right and left straight handle posts in cooperation with the right and left holders at a lower position on the right and left front legs or at an upper position on the right and left front legs.

6. The folding stroller according to claim 1, wherein the right and left front legs and the right and left rear legs are interconnected so as to be extendible and contractible in right and left directions.

* * * * *